(12) United States Patent
Zhao et al.

(10) Patent No.: US 10,454,080 B2
(45) Date of Patent: Oct. 22, 2019

(54) CONNECTOR ASSEMBLY FOR A BATTERY SYSTEM

(71) Applicants: TYCO ELECTRONICS CORPORATION, Berwyn, PA (US); TYCO ELECTRONICS JAPAN G.K., Kawasaki-shi (JP)

(72) Inventors: Weiping Zhao, Superior Township, MI (US); Haifeng Liu, Kanagawa (JP)

(73) Assignees: TE Connectivity Corporation, Berwyn, PA (US); TYCO Electronics Japan G.K., Kawasaki-shi, Kanagawa (JP)

( * ) Notice: Subject to any disclaimer, the term of this patent is extended or adjusted under 35 U.S.C. 154(b) by 324 days.

(21) Appl. No.: 15/208,828

(22) Filed: Jul. 13, 2016

(65) Prior Publication Data

US 2018/0019451 A1    Jan. 18, 2018

(51) Int. Cl.
*H01M 2/10* (2006.01)
*H01B 7/08* (2006.01)
(Continued)

(52) U.S. Cl.
CPC ............ *H01M 2/1011* (2013.01); *H01B 7/08* (2013.01); *H01M 2/1077* (2013.01); *H01M 2/206* (2013.01); *H01M 10/4207* (2013.01); *H01M 10/482* (2013.01); *H01R 4/18* (2013.01); *H01M 10/425* (2013.01); *H01M 2220/20* (2013.01)

(58) Field of Classification Search
CPC ............... H01M 10/48; H01M 10/482; H01M 2/204–206
See application file for complete search history.

(56) References Cited

U.S. PATENT DOCUMENTS 8,784,119 B2 * 7/2014 Tseng ..................... H01R 12/63
439/495
9,023,499 B2    5/2015 Takase et al.
(Continued)

FOREIGN PATENT DOCUMENTS

CN    102859754 B    3/2015
EP    2546906 A1    1/2013

OTHER PUBLICATIONS

International Search Report, International Application No. PCT/IB2017/054126, International Filing Date Jul. 7, 2017.

*Primary Examiner* — Ronald W Leja
*Assistant Examiner* — Christopher J Clark

(57) ABSTRACT

A connector assembly includes a connector having a plurality of terminals configured to be mated with a control module connector associated with a battery module and a multi-wire planar cable extending from the connector along a cable axis. The multi-wire planar cable has a plurality of flat wires terminated to corresponding terminals and a common jacket for the plurality of flat wires. The flat wires have exposed terminating portions at a sensor end of the multi-wire planar cable for termination to different voltage sensors associated with corresponding buss bars. The terminating portions are staggered along the cable axis. The multi-wire planar cable is angled such that the cable axis is non-parallel to a cell stack-up direction of the battery cells with the exposed terminating portions being aligned along a terminating axis generally parallel to the cell stack-up direction.

20 Claims, 4 Drawing Sheets

(51) Int. Cl.
  *H01M 2/20* (2006.01)
  *H01M 10/48* (2006.01)
  *H01R 4/18* (2006.01)
  *H01M 10/42* (2006.01)

(56) References Cited

U.S. PATENT DOCUMENTS

| | | | |
|---|---|---|---|
| 9,024,572 B2* | 5/2015 | Nishihara | H01M 2/1077 320/107 |
| 10,326,181 B2* | 6/2019 | Zhao | H01M 10/482 |
| 2008/0296044 A1* | 12/2008 | Chiang | H01B 7/38 174/117 FF |
| 2013/0309537 A1* | 11/2013 | Zhao | H01M 2/266 429/99 |
| 2014/0370343 A1* | 12/2014 | Nomoto | H01M 10/4207 429/90 |
| 2015/0380836 A1* | 12/2015 | Ikeda | H01R 12/59 439/422 |
| 2016/0133908 A1 | 5/2016 | Zhao | |
| 2016/0172651 A1* | 6/2016 | Ichikawa | H01M 2/206 429/121 |
| 2017/0110705 A1* | 4/2017 | Tosaya | H01M 2/206 |
| 2017/0179460 A1* | 6/2017 | Gotoh | H01M 2/1077 |
| 2018/0047958 A1* | 2/2018 | Sato | H01M 2/1077 |
| 2018/0131047 A1* | 5/2018 | Zhao | H01M 10/482 |
| 2018/0212223 A1* | 7/2018 | Zhao | H01M 2/206 |

* cited by examiner

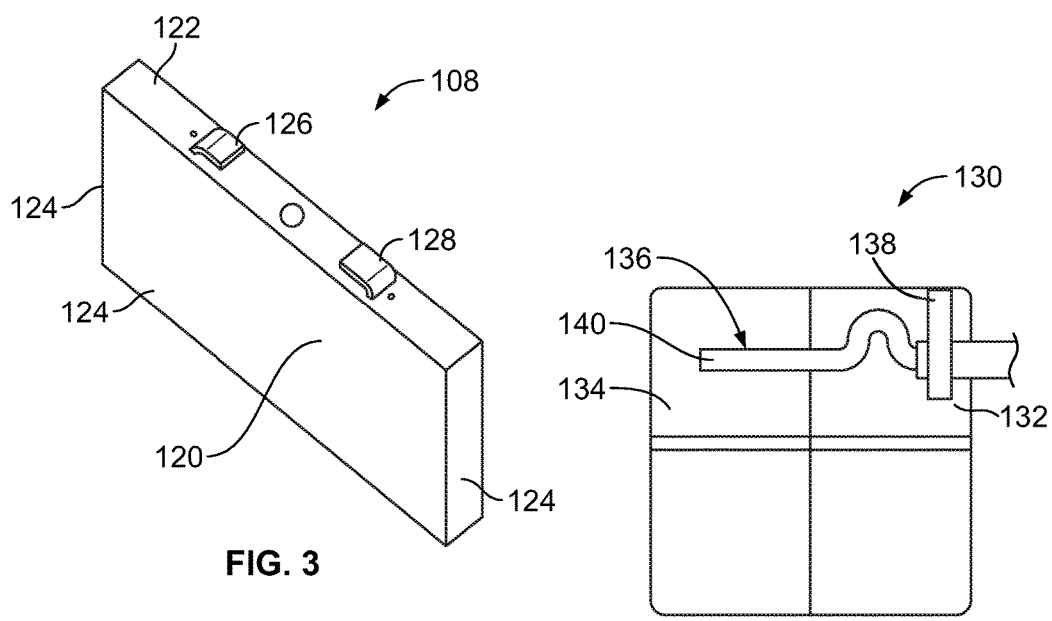
FIG. 3
FIG. 4
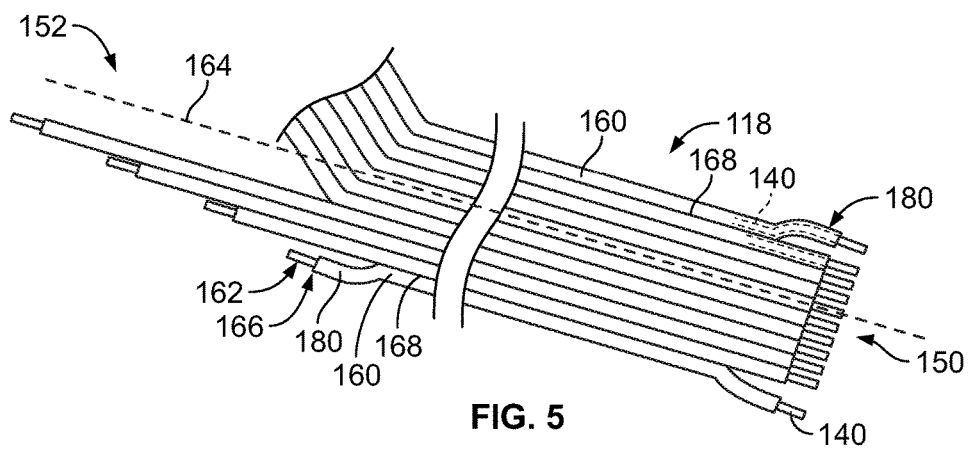
FIG. 5
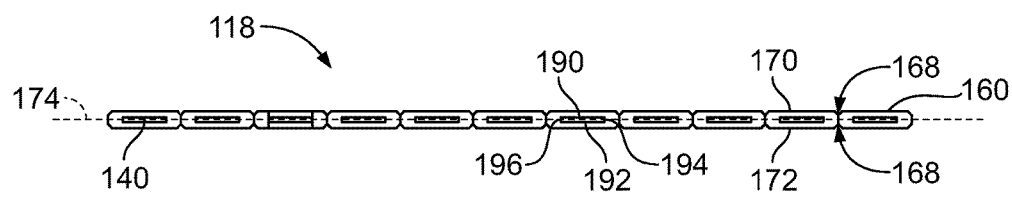
FIG. 6

CONNECTOR ASSEMBLY FOR A BATTERY SYSTEM

BACKGROUND OF THE INVENTION

The subject matter herein relates generally to battery connector systems.

Battery modules, such as those for electric vehicles or hybrid vehicles, typically includes a plurality of cells grouped together to form the battery modules. The battery modules are connected together to form battery packs. Each of the cells includes positive and negative cell terminals that are electrically connected together. The positive and negative cell terminals are connected using buss bars. Some systems are designed to monitor aspects of the battery cells, such as voltage, temperature and the like. Such systems provide sensors that are connected to a monitoring circuit. Round wires are typically connected to the sensors as parts of wire harnesses that interconnect the sensors and the monitoring circuit. Providing the round wires between each of the cells or buss bars and the monitoring unit adds bulk to the battery modules, particularly where the wires a stacked up and routed through the system. The wire harnesses are at risk for damage to the wires. Some systems use flexible printed circuits to reduce the thickness of the wires connecting to the buss bars. However flexible printed circuits are expensive and redesign or re-routing of the circuits can be expensive.

A need remains for battery modules that use low cost, flexible flat cables for termination of flat wires to components of the battery monitoring system.

BRIEF DESCRIPTION OF THE INVENTION

In one embodiment, a connector assembly is provided for voltage monitoring of buss bars electrically connecting adjacent battery cells of a battery module that includes a connector having a plurality of terminals configured to be mated with a control module connector associated with the battery module and a multi-wire planar cable extending from the connector along a cable axis. The multi-wire planar cable has a plurality of flat wires terminated to corresponding terminals and a common jacket for the plurality of flat wires. The flat wires have exposed terminating portions at a sensor end of the multi-wire planar cable for termination to different voltage sensors associated with corresponding buss bars. The terminating portions are staggered along the cable axis. The multi-wire planar cable is angled such that the cable axis is non-parallel to a cell stack-up direction of the battery cells with the exposed terminating portions being aligned along a terminating axis generally parallel to the cell stack-up direction.

In another embodiment, a carrier assembly for battery cells of a battery module is provided including a tray configured to be coupled to a top of the battery module over the battery cells and a connector assembly coupled to the tray. The tray holds a plurality of buss bars configured to electrically connect adjacent battery cells of the battery module. The buss bars have voltage sensors associated therewith. The connector assembly has a connector including a plurality of terminals configured to be mated with a control module connector associated with the battery module and a multi-wire planar cable extending from the connector along a cable axis. The multi-wire planar cable has a plurality of flat wires terminated to corresponding terminals and a common jacket for the plurality of flat wires. The flat wires have exposed terminating portions at a sensor end of the multi-wire planar cable for termination to different voltage sensors associated with corresponding buss bars. The terminating portions are staggered along the cable axis. The multi-wire planar cable is angled such that the cable axis is non-parallel to a cell stack-up direction of the battery cells with the exposed terminating portions being aligned along a terminating axis generally parallel to the cell stack-up direction.

In a further embodiment, a battery system is provided including a plurality of battery cells forming a battery module that are stacked in a cell stack-up direction and a carrier assembly mounted to the battery module. The carrier assembly has a tray holding a plurality of buss bars for electrically connecting adjacent battery cells of the battery module. The buss bars have voltage sensors sensing a voltage of the corresponding buss bar. A connector assembly is coupled to the tray. The connector assembly has a connector including a plurality of terminals configured to be mated with a control module connector associated with the battery module and a multi-wire planar cable extending from the connector along a cable axis. The multi-wire planar cable has a plurality of flat wires terminated to corresponding terminals and a common jacket for the plurality of flat wires. The flat wires have exposed terminating portions at a sensor end of the multi-wire planar cable for termination to different voltage sensors associated with corresponding buss bars. The terminating portions are staggered along the cable axis. The multi-wire planar cable is angled such that the cable axis is non-parallel to a cell stack-up direction of the battery cells with the exposed terminating portions being aligned along a terminating axis generally parallel to the cell stack-up direction.

BRIEF DESCRIPTION OF THE DRAWINGS

FIG. 3 is a top perspective view of a battery cell of the battery module formed in accordance with exemplary embodiment.

FIG. 4 is a top perspective view of a buss bar of the battery module formed in accordance with an exemplary embodiment.

FIG. 5 is a top view of a multi-wire planar cable in accordance with an exemplary embodiment.

FIG. 6 is a cross-sectional view of the multi-wire planar cable.

DETAILED DESCRIPTION OF THE INVENTION

Figure 1:
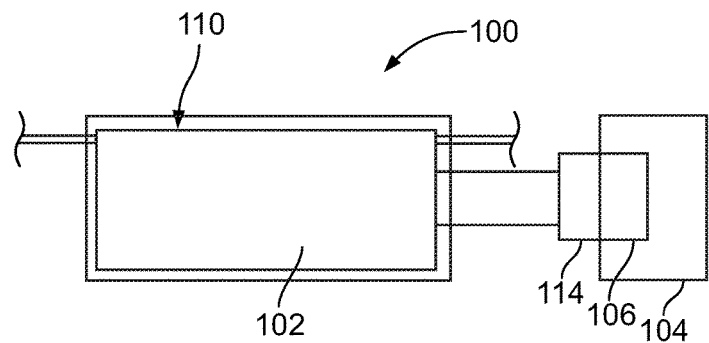
FIG. 1 is a schematic view of a battery system formed in accordance with an exemplary embodiment.

FIG. 1 is a top perspective view of a battery system 100 formed in accordance with an exemplary embodiment. The battery system 100 includes one or more battery modules 102 with corresponding carrier assemblies 110 mounted to the battery module(s) 102. The battery modules 102 may be stacked together as a battery pack used as part of the battery system 100, such as a battery system in a vehicle, such as an electric vehicle or a hybrid electrical vehicle. The battery system 100 may be used in other applications in alternative embodiments. The battery modules 102 may be contained within a housing.

The battery system 100 includes a battery control module 104, which may be mounted near to the battery module(s) 102. The battery control module 104 controls activities of the battery modules 102. The battery control module 104 may include or communicate with a vehicle system controller to verify that the battery module 102 is operating within the parameters set for the current condition of the battery module 102. The battery control module 104 may monitor the voltage of the cells of the battery module 102. The battery control module 104 may monitor the temperature of the battery module 102. The battery control module 104 may supply fault codes to the vehicle. The battery control module 104 may be mounted above the battery module 102 or may be provided elsewhere, such as along a side of the battery module 102 or remote from the battery module 102.

The battery system 100 includes one or more connector assemblies 114 coupled to the battery control module 104, such as to corresponding control module connectors 106 of the battery control module 104. The connector assemblies 114 are electrically coupled to voltage sensors, temperature sensors and the like within the battery module 102 and routed to the battery control module 104.

Figure 2:
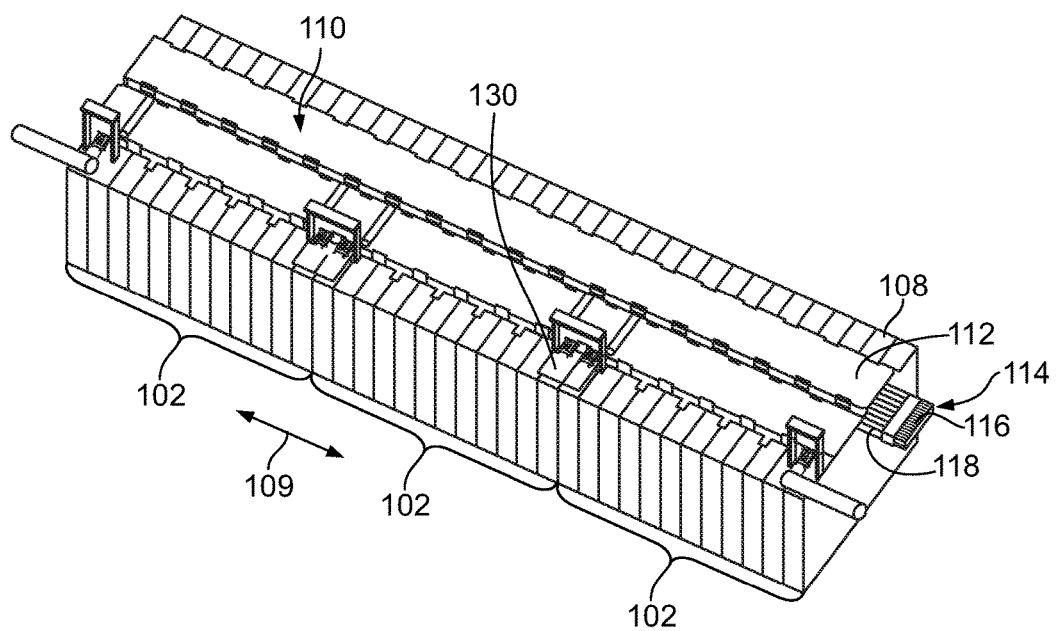
FIG. 2 is a top perspective view of battery modules of the battery system.

FIG. 2 is a top perspective view of a group of battery modules 102. The battery module 102 includes a plurality of battery cells 108, such as prismatic battery cells. The battery cells 108 are arranged in a stacked configuration, side-by-side, to form the battery module 102. The battery cells 108 are stacked in a cell stack-up direction 109. Optional, the battery module 102 may include a case or other housing that holds the battery cells 108. A battery cover may be provided over the tops of the battery cells 108. The battery cover may cover each of the battery cells 108.

Each battery module 102 includes a positive battery terminal and a negative battery terminal. The battery terminals are configured to be coupled to external power cables or alternatively may be bussed to battery terminals of another battery module 102. Optionally, the battery terminals may be connected using quick-connection types of connectors.

The carrier assembly 110 is provided over the battery module 102. The carrier assembly 110 holds the one or more connector assemblies 114. The carrier assembly 110 includes one or more trays 112 holding a plurality of buss bars 130 (shown in FIG. 4). The buss bars 130 have voltage sensors associated therewith. The connector assembly 114 is electrically connected to corresponding voltage sensors for monitoring voltage of the buss bars 130 and the battery cells 108.

The connector assembly 114 includes a connector 116 and a multi-wire planar cable 118 terminated to corresponding terminals held in the connector 116. The connector 116 is configured to be mated with the corresponding control module connector 106 (shown in FIG. 1) of the battery control module 104 (shown in FIG. 1). The connector assembly 114 is electrically connected to the buss bars 130 to monitor the voltage of the corresponding battery cells 108 of the battery module 102 by measuring the voltage across the buss bar 130 between the associated battery cells 108. For example, the plurality of flat wires of the cable 118 may be electrically connected to corresponding buss bars 130. The cable 118 may be a flat flexible cable.

FIG. 3 is a top perspective view of one of the battery cells 108 formed in accordance with exemplary embodiment. The battery cell 108 includes a cell housing 120 having a top 122 and side walls 124. In the illustrated embodiment, the cell housing 120 is boxed shaped having four side walls 124.

The battery cell 108 includes a positive cell terminal 126 and a negative cell terminal 128. In the illustrated embodiment, the terminals 126, 128 include flat pads having upper surfaces that define connection interfaces for electrical connection to corresponding buss bars 130 (shown in FIG. 4).

FIG. 4 is a top perspective view of one of the buss bars 130 formed in accordance with an exemplary embodiment. The buss bar 130 is used to electrically connect the cell terminals 126 or 128 (shown in FIG. 3) of adjacent battery cells 108 (shown in FIG. 2).

The buss bar 130 includes a positive plate 132 and a negative plate 134. The positive plate 132 is configured to be terminated to a corresponding positive cell terminal 126 of one battery cell 108 and the negative plate 134 is configured to be terminated to a corresponding negative cell terminal 128 of the adjacent battery cell 108. Optionally, the positive and negative plates 132, 134 may be of different metals, such as aluminum and copper.

The buss bar 130 includes a voltage sensor 136 associated therewith. For example, the voltage sensor 136 may be an integral part of the buss bar 130 that is electrically connected to the connector assembly 114 for voltage monitoring. In other various embodiments, the voltage sensor may be a separate component or connector connected to the buss bar 130. In the illustrated embodiment, the voltage sensor 136 is defined by the surface of one of the plates, such as the negative plate 134. In various other embodiments, the voltage sensor 136 may be a tab or protrusion extending from one of the plates, such as from an edge or a side of the buss bar 130. Optionally, such tab or protrusion may be stamped and formed with the buss bar 130. In alternative embodiments, the voltage sensor 136 may be a separate component coupled to the buss bar 130, such as by being soldered, welded, fastened or otherwise secured to the buss bar 130. In an exemplary embodiment, the voltage sensor 136 constitutes a weld tab configured to receive a flat wire 140 of the connector assembly 114 (shown in FIG. 1), which is welded to the weld tab. Welding provides a reliable connection with the flat wire 140 for accurate, reliable sensing. Other types of contacts other than the weld tab may be provided in alternative embodiments to connect to a corresponding component of the connector assembly 114, such as a crimp barrel, an insulation displacement contact, a spring contact, a pin, a socket, a poke-in wire connection, and the like. The flat wire 140 may be affixed to the buss bar 130, such as be crimping, welding, soldering, using conductive adhesive, and the like in other alternative embodiments.

In various embodiments, the buss bar 130 may include a strain relief tab 138 for securing the flat wire 140 to the buss bar 130, such as to reduce strain at the connection point of the flat wire 140 to the voltage sensor 136. For example, the strain relief tab 138 may reduce strain at the weld point between the flat wire 140 and the buss bar 130. In the illustrated embodiment, the strain relief tab 138 is a tab configured to be folded over to pinch the insulation of the flat wire 140 near the voltage sensor 136. Other types of strain relief tabs may be provided in alternative embodiments.

FIG. 5 is a top view of the multi-wire planar cable 118 in accordance with an exemplary embodiment. FIG. 6 is a cross-sectional view of the cable 118. The cable 118 extends between a connector end 150 and a sensor end 152. The flat wires 140 at the connector end 150 are configured to be terminated to corresponding terminals of the connector 116

(shown in FIG. 2). The flat wires 140 at the sensor end 152 are configured to be terminated to corresponding voltage sensors 136 (shown in FIG. 4).

The cable 118 has a plurality of the flat wires 140 and a common jacket 160 for the plurality of flat wires 140. The flat wires 140 are metal conductors having a rectangular cross-section. The cable 118 is flat or planar. The cable 118 is flexible. The cable 118 has the flat wires 140 arranged in a stacked arrangement with the flat wires 140 side-by-side. Each of the flat wires 140 are connected together as a unit by the common jacket 160. In an exemplary embodiment, the sensor end 152 of the cable 118 is stepped such that each of the flat wires 140 have different lengths. For example, the flat wires 140 are progressively shorter or progressively longer from the outer side of the cable 118. The flat wires 140 have terminating portions 162 at the sensor end 152. In an exemplary embodiment, the terminating portions 162 are exposed at the sensor end 152 for termination to the buss bars 130, such as by welding to the buss bars 130. For example, portions of the jacket material surrounding the end of the flat wire 140 are removed to expose the flat wire 140. The terminating portions 162 are staggered along a cable axis 164 of the cable 118. For example, the staggering of the terminating portions 162 defines the stepped sensor end 152. In an exemplary embodiment, the terminating portions 162 are provided at distal ends of the flat wires 140, which are provided at different distances from the connector end 150 and the connector 116.

Optionally, the flat wires 140 may be separated from each other for a length at the connector end 150 and/or the sensor end 152. For example, each terminating portion 162 may be separated from the other flat wires 140 and the main jacket 160. Such separated portions allow the flat wires 140 to be independently movable relative to the other flat wires 140, such as for termination to the terminals or for termination to the buss bars 130. For example, the separated portions may be torn or cut to separate portions of the flat wires 140. The separated portions may be referred to as cablets 166 of the cable 118. Portions of the flat wires 140 may be removed downstream of the cablets 166 to define the staggered sensor end 152 of the cable 118. As such, the cablets 166 may be staggered along the cable axis 164. Each cablet 166 has one of the flat wires 140 and the corresponding portion of the material of the jacket 160. The cablets 166 are independently movable relative to each other. The cablets 166 each include the corresponding exposed portion of the flat wire 140 at the terminating portion 162 and may include at least a segment of jacketed portion defining an insulating sleeve around the flat wire 140.

In an exemplary embodiment, the cable 118 includes grooves 168 in the jacket 160. The cablets 166 may be separated at the grooves 168. The grooves 168 may be centered between adjacent flat wires 140. The grooves 168 may be V-shaped to force separation at the point of the groove 168, such as along the bisector line between the grooves 168. The grooves 168 define boundaries between the flat wires 140 and force separation to occur along the grooves 168. Without the grooves, tearing or cutting may wander away from one flat wire 140 and toward another flat wire 140 leading to some flat wires 140 have more jacketing material and other flat wires 140 having less jacketing material. Without controlled separation, portions of the flat wires 140 may be exposed by the tearing or cutting. In other various embodiments, the cable 118 may be provided without the grooves 168 defined between the flat wires 140. In such embodiments, the cablets 166 may be separated mechanically, such as with a cutting knife, a laser cutter or other type of device.

The jacket 160 is insulative and made from a dielectric material, such as polyurethane, polyvinylchloride, chlorinated polyethylene, thermoplastic elastomer, rubber, and the like. The jacket 160 has a top surface 170 and a bottom surface 172 opposite the top surface 170. The top and bottom surfaces 170, 172 are generally planar. A cable plane 174 (FIG. 6) of the cable 118 is defined between the top and bottom surfaces 170, 172. The jacket 160 has a thickness between the top and bottom surfaces 170, 172. The thickness is relatively small compared to a length and a width of the cable 118. The thickness may be reduced at the grooves 168. For example, the thickness may be reduced by approximately 10%, by approximately 30%, by approximately 50%, or more at the grooves 168. Optionally, the grooves 168 may be provided on both the top surface 170 and the bottom surface 172; however the grooves 168 may be provided on only the top surface 170 or the bottom surface 172 in alternative embodiments. The grooves 168 may be aligned with each other across the cable 118 in an exemplary embodiment.

In an exemplary embodiment, the cablets 166 have jacket portions 180 surrounding the flat wires 140 that define insulating sleeves and may be referred to hereinafter as insulating sleeves 180. The insulating sleeves 180 extend a length of the flat wires 140 to separation points along the jacket 160 where the jacket portion 180 breaks off from the jacket 160. The terminating portions 162 of the flat wires 140 are exposed beyond the insulating sleeves 180 at distal ends of the flat wires 140 for termination to the voltage sensor 136. Alternatively, rather than exposing the terminating portions 162 beyond the insulating sleeves 180, the terminating portions 162 may be exposed through the insulating sleeve 180, such as from the top surface 170 and/or the bottom surface 172. For example, a portion of the jacket portion 180 may be removed to define a window exposing the flat wire 140. The exposed portion of the flat wire 140 may be electrically connected to the terminal or the voltage sensor 136. In other various embodiments, the flat wire 140 may be electrically connected to the voltage sensor 136 by the voltage sensor 136 piercing the jacket 160. For example, the voltage sensor 136 may be terminated by a pierce crimp.

The flat wires 140 have an upper flat side 190, a lower flat side 192 and opposite first and second edges 194, 196 between the flat sides 190, 192. In an exemplary embodiment, the insulating sleeves 180 surround the sides 190, 192 and the edges 194, 196 to ensure that no portion of the flat wires 140 are exposed, which could lead to a short circuit or arcing.

Figure 7:
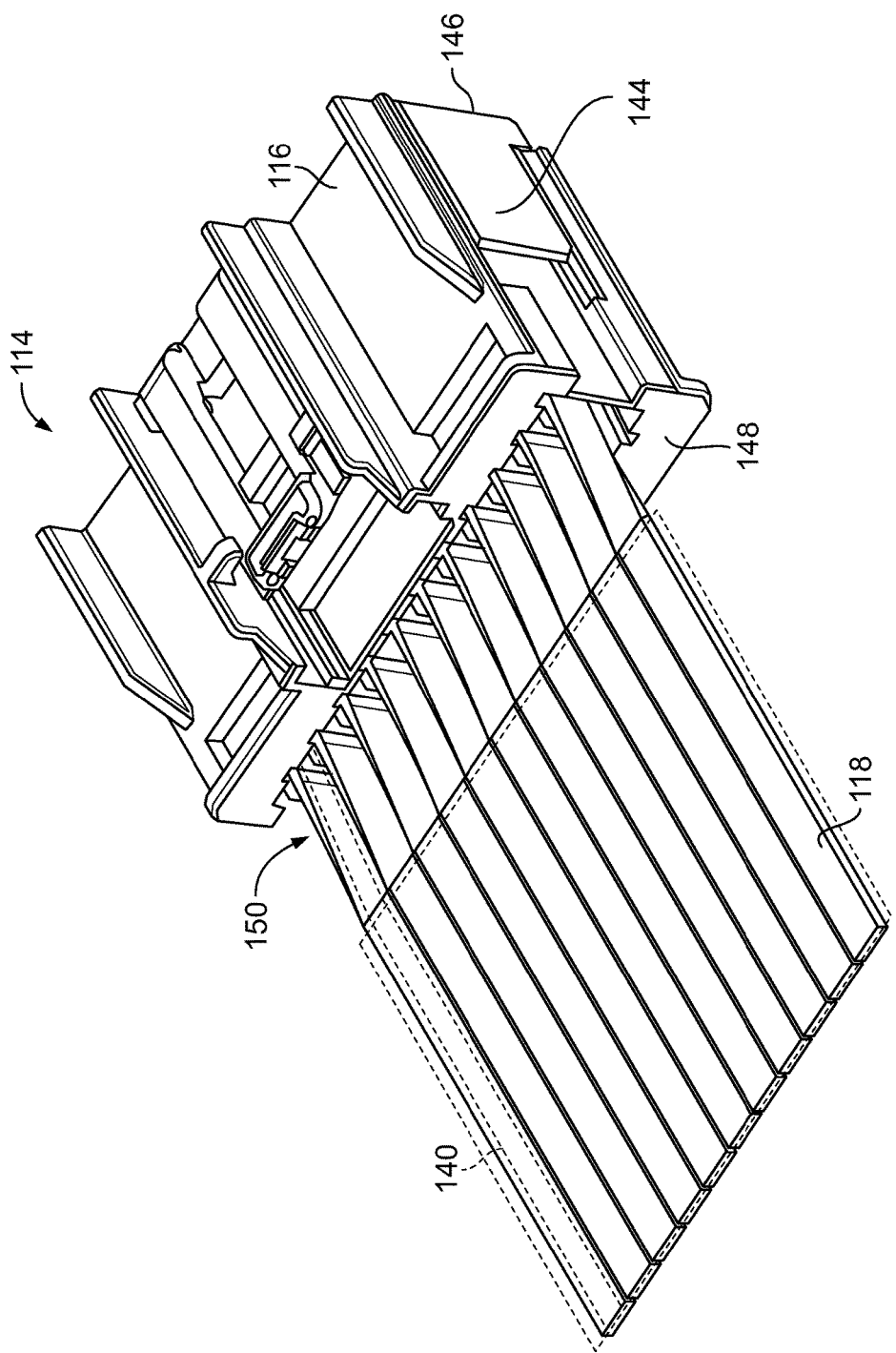
FIG. 7 is a perspective view of a portion of a connector assembly of the battery system.

FIG. 7 is a perspective view of a portion of the connector assembly 114. The connector assembly 114 includes the connector 116 provided at the connector end 150 of the multi-wire planar cable 118. The cable 118 includes a plurality of the flat wires 140, which are connected to corresponding voltage sensors 136 (shown in FIG. 4) and to corresponding terminals of the connector 116.

The connector 116 includes a housing 144 holding the terminals (not shown). The housing 144 extends between a front 146 and a rear 148. The front 146 defines a mating end of the connector 116 configured for mating with the control module connector 106 (shown in FIG. 1).

Figure 8:
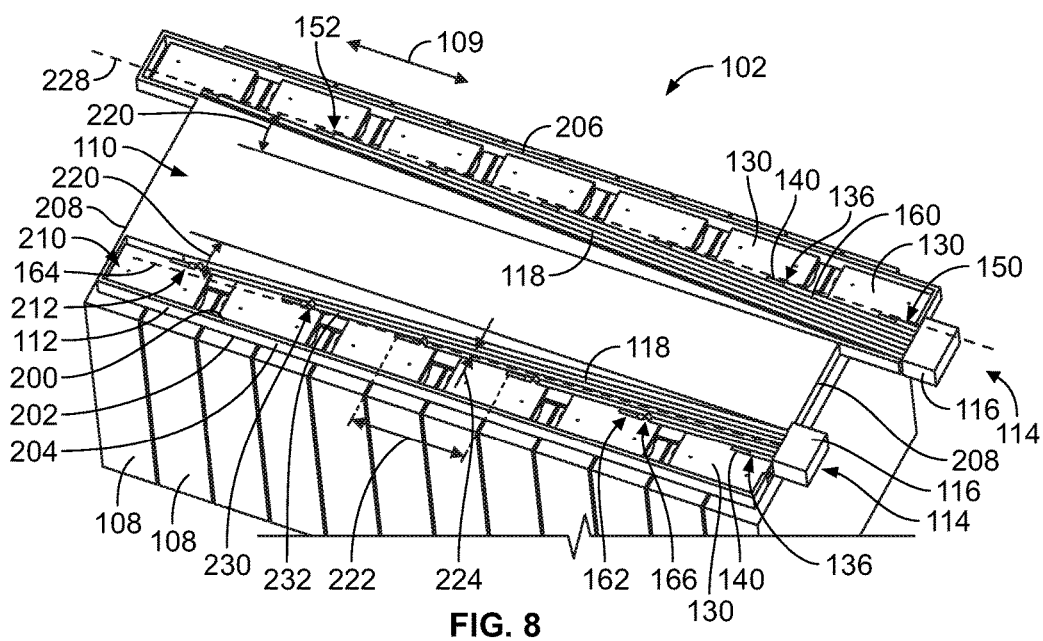
FIG. 8 is a front perspective view of a carrier assembly mounted to a battery module of the battery system including a plurality of the connector assemblies.
Figure 9:
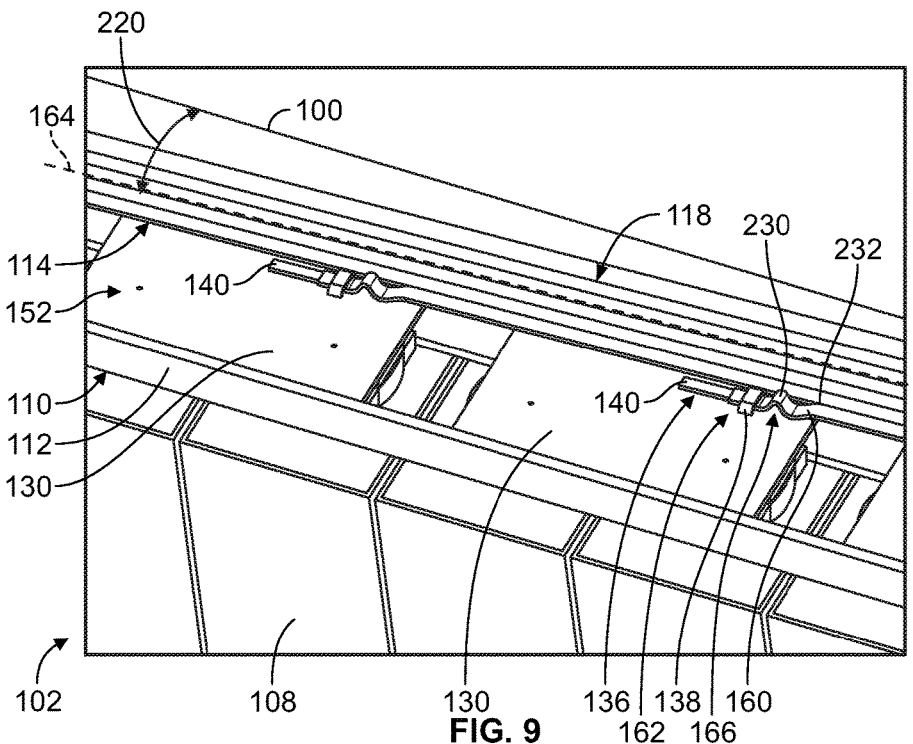
FIG. 9 is an enlarged perspective view of a portion of the carrier assembly in accordance with an exemplary embodiment.

FIG. 8 is a front perspective view of the carrier assembly 110 and a plurality of the connector assemblies 114 mounted to a battery module 102. FIG. 9 is an enlarged perspective view of a portion of the carrier assembly 110. The carrier assembly 110 includes the tray 112 holding the buss bars 130. The tray 112 includes a top 200 and a bottom 202. The bottom 202 is configured to be mounted to the battery module 102. The tray 112 includes a front 204 and a rear 206 with sides 208 therebetween. A cover may be coupled to the tray 112 at the top 200 to cover the cable 118.

The tray 112 includes pockets 210 receiving corresponding buss bars 130. Optionally, the pockets 210 may be positioned generally along the front 204 and the rear 206. The tray 112 includes channels 212 extending between various pockets 210. The cables 118 may be routed in the channels 212 to interface with the corresponding buss bars 130.

In an exemplary embodiment, the sensor end 152 of the cable 118 is stepped such that the terminating portions 162 are staggered. The terminating portions 162 may be separated from the jacket 160 for termination to the buss bars 130. The terminating portions 162 may be cut to length, separated and or stripped prior to positioning in the tray 112 and terminating to the buss bars 130. The flat wires 140 have different lengths such that the terminating portions 162 are staggered to extend to the different buss bars 130 for termination to different voltage sensors 136. Optionally, the cable 118 may be branched in multiple directions, such as opposite directions such that the connector 116 may be approximately centered relative to the battery module 102 as opposed to being provided at the end of the battery module 102. Optionally, multiple cables 118 may be stacked or cross over each other as the cables 118 are routed within the tray 112 to the connector 116. The cables 118 may be folded over to change a routing direction of the cable 118. Optionally, some flat wires 140 of the cable 118 may be routed to sensors other than voltage sensors, such as a temperature sensor.

In an exemplary embodiment, the cable 118 is arranged in the tray 112 at an alignment angle 220 relative to the cell stack-up direction 109. The cable 118 is angled such that the cable axis 164 is non-parallel to the cell stack-up direction 109. The angled cable axis 164 ensures that each of the terminating portions 162 are configured to be coupled to the corresponding buss bars 130. For example, because the sensor end 152 is stepped with the terminating portions 162 being staggered along the length of the cable 118 (e.g., along the cable axis 164) and staggered across the cable 118 (e.g., side-to-side), the cable 118 is angled to successively align the terminating portions 162 with the corresponding buss bars 130. The buss bars 130 are stacked in the cell stack-up direction 109 along the stack of battery cells 108. Each terminating portion 162 is angled from the connector 116 toward the buss bar 130 to align with the voltage sensor 136. For example, the inner-most flat wire 140 (relative to the center of the tray 112) is angled from the connector 116 to the corresponding buss bar 130 (e.g., the end-most buss bar 130 furthest from the connector 116). The flat wire 140 immediately inside of the inner-most flat wire 140 is angled from the connector 116 to the corresponding buss bar 130 (e.g., the second buss bar from the end), and so on down the line of flat wires 140 and buss bars 130. The flat wires 140 of the cable 118 are angled relative to the buss bars 130 (e.g., angled relative to the edge of the buss bar 130).

The alignment angle 220 may be any non-parallel angle relative to the cell stack-up direction 109. The alignment angle 220 may be determined based on a pitch 222 between terminating portions 162 (e.g., the distance between the weld points of the terminating portions 162), or alternatively, the length of the longest flat wire 140 (e.g., the distance from the connector 116 to the weld point of the longest flat wire 140). The alignment angle 220 may be determined based on a width 224 of each cablet 166, or alternatively the cumulative width of the cablets 166 which is the width of the cable 118.

In an exemplary embodiment, each of the terminating portions 162 are aligned along a terminating axis 228, which is non-parallel to the cable axis 164. The terminating axis 228 may be generally parallel with the cell stack-up direction 109. The terminating axis 228 may be aligned with the voltage sensors 136 over the buss bars 130.

In an exemplary embodiment, the buss bars 130 are identical to each other and positioned at the same locations relative to the battery cells 108 (e.g., the same distance from the front 204 of the tray 112 and/or the same distance from the outer edge of the battery cells 108). The connector 116 is positioned generally laterally interior of the buss bars 130, such as closer to the center of the tray 112. As such, the inner-most flat wire 140 is positioned further laterally interior of the outer-most flat wire 140, which is positioned closest to the buss bars 130. In order for each of the terminating portions 162 to be terminated at the same locations of the corresponding buss bars 130, the cable 118 is angled at the alignment angle 220. Having each of the terminating portions 162 terminated to the same location of the corresponding buss bars 130 makes manufacture and assembly easier. For example, the laser weld tool used to laser weld the exposed terminating portions 162 to the voltage sensors 136 may be easily positioned relative to the terminating portions 162. For example, the laser weld tool may only move in a linear direction along the terminating axis 228 and does not need to shift laterally to align with the terminating portions 162. The buss bars 130 may all be identical as the voltage sensors 136 may all be positioned at the same location and do not need to be shifted laterally to line up with staggered terminating portions (which would be the case if the cable 118 were parallel to the cell stack-up direction 109).

In an exemplary embodiment, connector assemblies 114 are provided along both the front 204 and the rear 206 of the tray 112. The first and second connector assemblies 114 have the connectors 116 at the same side of the battery module 102 with the cables 118 extending toward the opposite side of the battery module 102. The first cable 118 is terminated to the buss bars 130 at the front 204 and the second cable 118 is terminated to the buss bars 130 at the rear 206. The cables 118 are angled away from each other. For example, the cable 118 closer to the front 204 is angled toward the front 204 and the cable 118 toward the rear 206 is angled toward the rear 206. The distal ends of the cables 118 are further apart than the connector ends 150 of the cables 118.

In an exemplary embodiment, the cable 118 includes strain relief portions 230. The strain relief portions 230 are provided near the terminating portions 162 to provide strain relief at the buss bars 130, such as at the weld points between the terminating portions 162 and the buss bars 130. Optionally, each cablet 166 includes one of the strain relief portions 230. The strain relief portion 230 may be aligned with the corresponding buss bar 130, such as proximate to the termination point of the terminating portion 162 with the buss bar 130. The strain relief portion 230 may be defined by a portion of the terminating portion 162 or cablet 166 that is bunched up to provide slack in the terminating portion 162 or cablet 166. The strain relief portion 230 allows movement of the terminating portion 162 relative to other portions of the cable 118. For example, when the battery cell 108 and/or buss bar 130 is subject to expansion/contraction and/or vibration, the slack in the terminating portion 162 relieves stresses at the weld point. The strain relief portion 230 is provided downstream of a separation point 232 from the cable 118. Optionally, the separation point 232 may be close to the termination point of the terminating portion 162 with the buss bar 130. For example, the separation point 232 may be aligned with the buss bar 130. Optionally, the strain relief portion 230 may be provided between the strain relief tab 138 (shown in FIG. 4) and the separation point 232.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector assembly for voltage monitoring battery cells of a battery module, the connector assembly comprising:
    a connector having a plurality of terminals configured to be mated with a control module connector associated with the battery module;
    a multi-wire planar cable extending from the connector, the multi-wire planar cable including a cable axis defined along a majority of a length of the multi-wire planar cable, the multi-wire planar cable having a plurality of flat wires terminated to corresponding terminals and a common jacket for the plurality of flat wires, the flat wires having conductors extending parallel to the cable axis, the flat wires having exposed terminating portions at a sensor end of the multi-wire planar cable for termination to different voltage sensors associated with corresponding buss bars of the battery module, the terminating portions being staggered along the cable axis, wherein the multi-wire planar cable is angled such that the cable axis is non-parallel to a cell stack-up direction of the battery cells with the exposed terminating portions being aligned along a terminating axis generally parallel to the cell stack-up direction.

2. The connector assembly of claim 1, wherein each flat wire has a different length between the connector and the corresponding terminating portion.

3. The connector assembly of claim 1, wherein each flat wire ends at the corresponding exposed terminating portion.

4. The connector assembly of claim 1, wherein the sensor end is stepped defined by the staggered terminating portions.

5. The connector assembly of claim 1, wherein the terminating portions are separated from other flat wires and are independently movable relative to the other flat wires.

6. The connector assembly of claim 1, wherein the cable axis of the planar cable is angled relative to the buss bars.

7. The connector assembly of claim 1, wherein the angle of the planar cable relative to the cell stack-up direction is defined by a width of the terminating portions and a pitch between the terminating portions.

8. The connector assembly of claim 1, wherein each terminating portion includes a strain relief portion allowing the terminating portion to move relative to the other flat wires.

9. The connector assembly of claim 1, wherein the planar cable includes a plurality of cablets associated with corresponding flat wires, each cablet includes the corresponding exposed terminating portion and an insulating sleeve surrounding the flat wire, the insulating sleeve being a portion of the jacket of the planar cable, the cablet being independently movable relative to the other flat wires.

10. The connector assembly of claim 9, wherein the cablet is separated from the planar cable at a separation point, the separation point being aligned with the buss bar to which the corresponding terminating portion is terminated.

11. The connector assembly of claim 1, wherein the planar cable is angled away from a second planar cable.

12. The connector assembly of claim 1, wherein the jacket includes grooves between adjacent flat wires for controlled separation of the terminating portions and surrounding jacket portions.

13. A carrier assembly for battery cells of a battery module, the carrier assembly comprising:
    a tray configured to be coupled to a top of the battery module over the battery cells, the tray holding a plurality of buss bars configured to electrically connect adjacent battery cells of the battery module, the buss bars having voltage sensors associated therewith;
    a connector assembly coupled to the tray, the connector assembly having a connector including a plurality of terminals configured to be mated with a control module connector associated with the battery module and a multi-wire planar cable extending from the connector, the multi-wire planar cable including a cable axis defined along a majority of a length of the multi-wire planar cable, the multi-wire planar cable having a plurality of flat wires terminated to corresponding terminals and a common jacket for the plurality of flat wires, the flat wires having conductors extending parallel to the cable axis, the flat wires having exposed terminating portions at a sensor end of the multi-wire planar cable for termination to different voltage sensors associated with corresponding buss bars, the terminating portions being staggered along the cable axis, wherein the multi-wire planar cable is angled such that the cable axis is non-parallel to a cell stack-up direction of the battery cells with the exposed terminating portions being aligned along a terminating axis parallel to the cell stack-up direction.

14. The carrier assembly of claim 13, wherein each flat wire has a different length between the connector and the corresponding terminating portion.

15. The carrier assembly of claim 13, wherein the sensor end is stepped defined by the staggered terminating portions.

16. The carrier assembly of claim 13, wherein the terminating portions are separated from other flat wires and are independently movable relative to the other flat wires.

17. The carrier assembly of claim 13, wherein the angle of the planar cable relative to the cell stack-up direction is defined by a width of the terminating portions and a pitch between the terminating portions.

18. The carrier assembly of claim 13, wherein the tray holds a second connector assembly, the planar cable is angled away from a second planar cable of the second connector assembly.

19. A battery system comprising:
- a plurality of battery cells forming a battery module, the battery cells being stacked in a cell stack-up direction;
- a carrier assembly mounted to the battery module, the carrier assembly having a tray holding a plurality of buss bars for electrically connecting adjacent battery cells of the battery module, the buss bars having voltage sensors sensing a voltage of the corresponding buss bar; and
- a connector assembly coupled to the tray, the connector assembly having a connector including a plurality of terminals configured to be mated with a control module connector associated with the battery module and a multi-wire planar cable extending from the connector, the multi-wire planar cable including a cable axis defined along a majority of a length of the multi-wire planar cable, the multi-wire planar cable having a plurality of flat wires terminated to corresponding terminals and a common jacket for the plurality of flat wires, the flat wires having conductors extending parallel to the cable axis, the flat wires having exposed terminating portions at a sensor end of the multi-wire planar cable for termination to different voltage sensors associated with corresponding buss bars, the terminating portions being staggered along the cable axis, wherein the multi-wire planar cable is angled such that the cable axis is non-parallel to a cell stack-up direction of the battery cells with the exposed terminating portions being aligned along a terminating axis parallel to the cell stack-up direction.

20. The battery system of claim 19, wherein each flat wire has a different length between the connector and the corresponding terminating portion.

\* \* \* \* \*